United States Patent [19]

Spicer et al.

[11] Patent Number: 4,631,077
[45] Date of Patent: Dec. 23, 1986

[54] FOAM PLASTIC AIR FILTER

[75] Inventors: Barry Spicer, Northants; Joseph T. Wills, Northampton, both of England

[73] Assignee: PipercrossLimited, Lutterworth, England

[21] Appl. No.: 716,087

[22] Filed: Mar. 26, 1985

[51] Int. Cl.⁴ ............................................. B01D 25/04
[52] U.S. Cl. ........................................ 55/487; 55/500; 55/522; 55/DIG. 13; 55/524; 55/511
[58] Field of Search ................ 55/486, 487, 500, 501, 55/510, 522, 524, 511, DIG. 13

[56] References Cited

U.S. PATENT DOCUMENTS

| | | | |
|---|---|---|---|
| 2,966,960 | 1/1951 | Rochlin | 55/487 |
| 3,149,942 | 9/1964 | Finch | 55/522 |
| 3,882,961 | 5/1975 | Cannan et al. | 55/522 |
| 4,350,507 | 9/1982 | Greenough et al. | 55/524 |
| 4,456,648 | 6/1984 | Adamse et al. | 55/524 |

FOREIGN PATENT DOCUMENTS

| | | | |
|---|---|---|---|
| 1097917 | 1/1968 | United Kingdom | 55/524 |
| 1302878 | 1/1973 | United Kingdom | 55/487 |
| 1322718 | 7/1973 | United Kingdom | 55/487 |

*Primary Examiner*—Bernard Nozick
*Attorney, Agent, or Firm*—Bert J. Lewen; Henry Sternberg

[57] ABSTRACT

An air filter comprising a first layer of reticulated foam plastic material having a thickness of between 10 mm and 20 mm and a porosity of between 5 and 60 pores to the linear inch, a second layer of reticulated foam plastic material having a thickness of between 6 mm and 10 mm and a porosity of between 60 and 100 pores to the linear inch, and at the interface between said first and second layers an open mesh substrate approximately one millimeter in thickness constricting a maximum of about ten percent of each of the first and second layers, the filter being impregnated with a flame proof retention and plasticizer additive, the first and second layers being bonded together at the interface.

1 Claim, 8 Drawing Figures

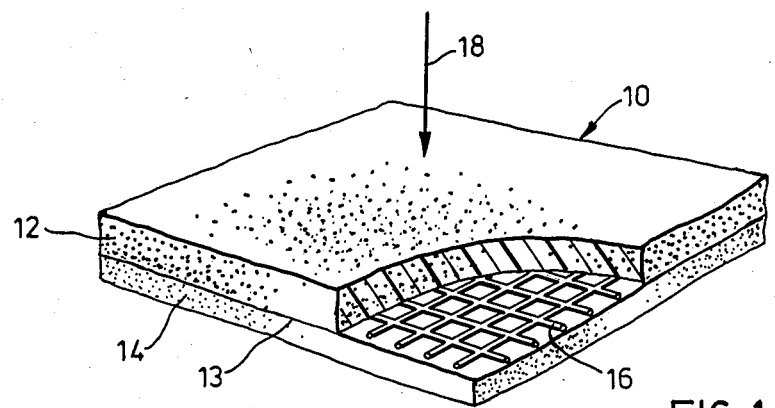
FIG. 1
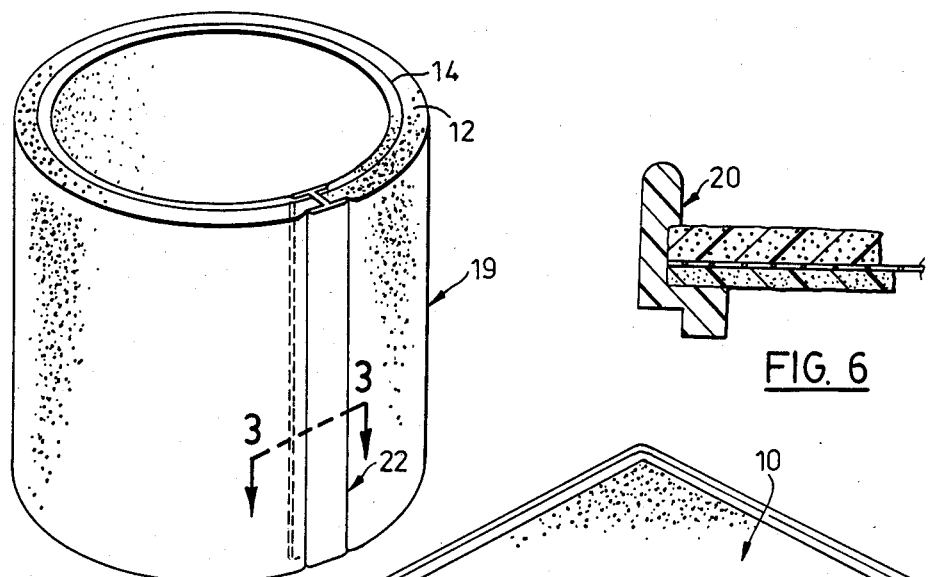
FIG. 2
FIG. 6
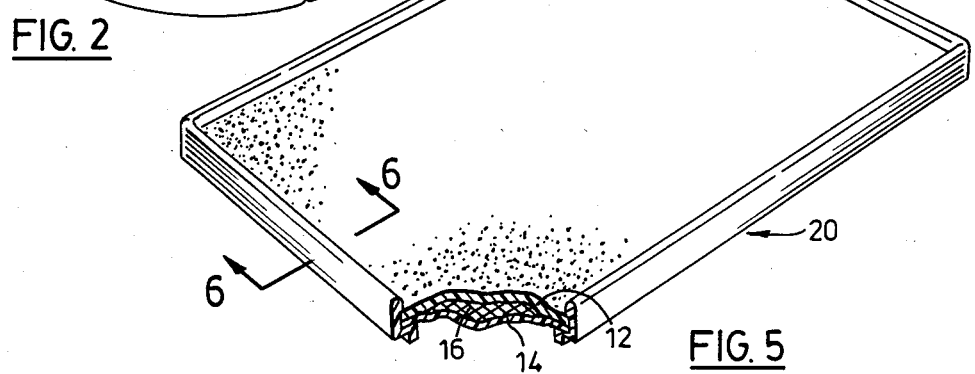
FIG. 5

FOAM PLASTIC AIR FILTER

FIELD OF THE INVENTION

This invention relates to an air filter, for example for use in internal combustion engines and compressors or in hot air heating furnaces, and more particularly to a compound foam plastic air filter.

BACKGROUND OF THE INVENTION

Air filters presently in use in automotive vehicles, used to filter harmful contaminants such as dust particles from the air intake of internal combustion engines, are made of paper which is pleated to produce a large surface area for entrapment of the particles. Recently a plastic foam filter, consisting of a single sheet of reticulated foam coated with engine oil, has appeared on the market under the trademark FILTRON as a sustitute for a paper filter for internal combustion engines, to reduce costs. However, the FILTRON device does not filter as well as a paper air filter although its life can be extended by washing it.

It is an object of the present invention to provide a foam plastic air filter which exceeds the breathing characteristics, during service life, of a pleated paper air filter.

SUMMARY OF THE INVENTION

Essentially the invention consists of an air filter comprising a first layer of reticulated foam plastic material having a thickness of between 10 mm and 20mm and a porosity of between 5 and 60, preferably 45±4 pores to the linear inch, a second layer of reticulated foam plastic material having a thickness of between 6 mm and 10 mm and a porosity of between 60 and 100, preferably 65±2 pores to the linear inch, and at the interface between said first and second layers an open mesh substrate approximately one millimeter in thickness constricting a maximum of about ten percent of each of the first and second layers, the filter being impregnated with a flame proof retention and plasticiser additive, the first and second layers being mechanically or chemically bonded together at the interface.

BRIEF DESCRIPTION OF DRAWINGS

An example embodiment of the invention is shown in the accompanying drawings in which:

FIG. 1 is a perspective view of a filter of the invention, one edge being separated to show the structure of the filter;

FIG. 2 is a perspective view of a hollow cylindrical configuration of the filter of FIG. 1;

FIG. 5 is a perspective view of a flat configuration of the filter of FIG. 1 mounted in a gasket;

FIG. 6 is a cross-section view taken along line 6—6 of FIG. 5;

DESCRIPTION OF PREFERRED EMBODIMENT

Figure 7:
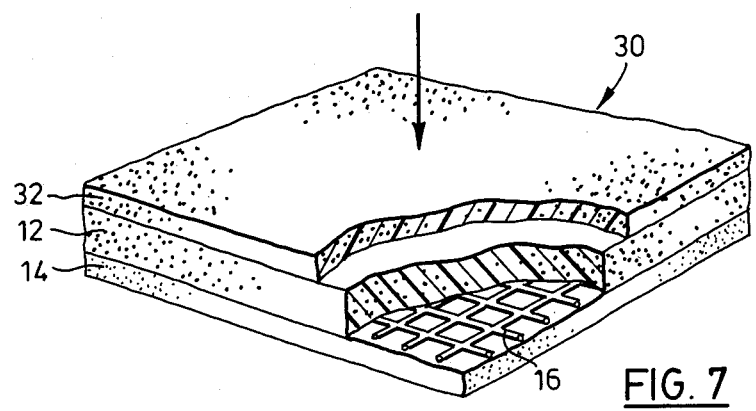
FIG. 7 is a perspective view, similar to FIG. 1, showing an alternate embodiment of the filter of the invention.

The example embodiment shown in the drawings consists of an air filter 10 having a primary or first layer 12 and a second layer 14 of foam plastic material with an open mesh substrate 16 at the interface between the two layers.

Each layer 12 and 14 is a reticulated foam plastic of polyurethane. The open pores of first layer 12, which is the layer onto which the air impinges as indicated by arrow 18, has coarser open pores than second layer 14. For proper operability layer 12 must have a porosity of 45±4 pores to the linear inch, i.e. optimally the pores should be 45 to the linear inch but the filter is operable for a porosity range of 41 to 49 pores to the linear inch. Similarly the open pores of second layer 14 optimally should be 65 to the linear inch but a range of 63 to 67 pores to the linear inch is acceptable.

The specific range of thickness of layers 12 and 14 is also essential: the thickness of first layer 12 must be between 10 mm and 20 mm while the thickness of second layer 14 must be between 6 mm and 10 mm. The optimum total thickness of filter 10 is between 15.5 mm and 30 mm.

Open mesh substrate 16 is preferably a grid of flexible polypropylene. In order not to restrict the flow of air through filter 10 unduly, substrate 16 should not have a surface area more than 10% of the surface area of layer 12 or 14.

Filter 10 is formed by bonding first layer 12 to second layer 14 at their interface 13. Mechanical attachment of the layers 12 and 14 by flame bonding is preferred since a minimum thickness of the two layers is affected which would adversely affect the operation of the filter. More than 0.5 mm thickness of bonding is considered unacceptable. Chemical bonding may be used to attach layers 12 and 14, for example using an isocyanate adhesive.

Filter 10 is impregnated with a retentive additive to hold the dust particles which are trapped in the filter. The retention additive is a chlorine modified long chain paraffinic hydrocarbon which is stabilized for elevated temperature application to the filter by the addition of a soya bean oil extract. This retention and plasticiser additive is flame retardant.

The retention additive is applied to filter 10 after layers 12 and 14 have been bonded together. Preferably the additive at an elevated temperature is sprayed onto the filter and the filter is passed between rollers to compress the filter and impregnate it with the additive. Open mesh substrate 16 acts to ensure that the correct amount of retention additive is retained in filter 10 and also acts as a reservoir for the additive at interface 13 between layers 12 and 14.

Figure 3:
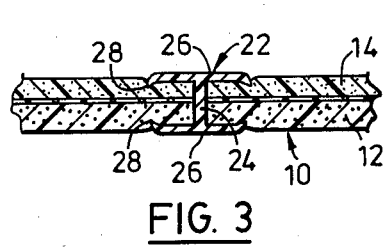
FIG. 3 is a cross-sectional view taken along line 3—3 of FIG. 2.
Figure 4:
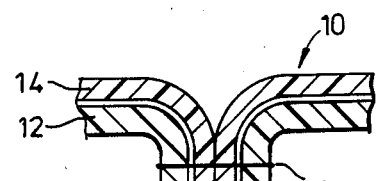
FIG. 4 is a cross-sectional view similar to FIG. 3 showing the opposed edges of the cylinder stitched.

Filter 10 may be used in its flat configuration or it may be formed into a hollow cylinder 19 as seen in FIG. 2. If flat, a gasket 20 may be bonded to the filter as shown in FIG. 4 and 5. To form a cylinder, opposing edges of the fiter are clamped together and in a preferred embodiment a clamp 22 is employed in strip form, as shown in FIGS. 2 and 3, preferably of extruded PVC. having a central web 24 interconnecting a pair of spaced flanges 26 which carry opposed inwardly directed ridges 28. Flanges 26 are sufficiently flexible to be spread apart for the insertion of the opposed edge portions of filter 10 and when the opposed edges each come into contact with web 24 the flanges are released, allowing ridges 28 to press into the filter and clamp it. The use of clamp 22 is advantageous since it seals the joined edges of filter 10 against leakage of air around the filter. Also, clamp 22 may be positioned directly in front of the stream of air directed to the filter, thus dissipating the air around the filter instead of impinging directly on it in a restricted area.

Figure 8:
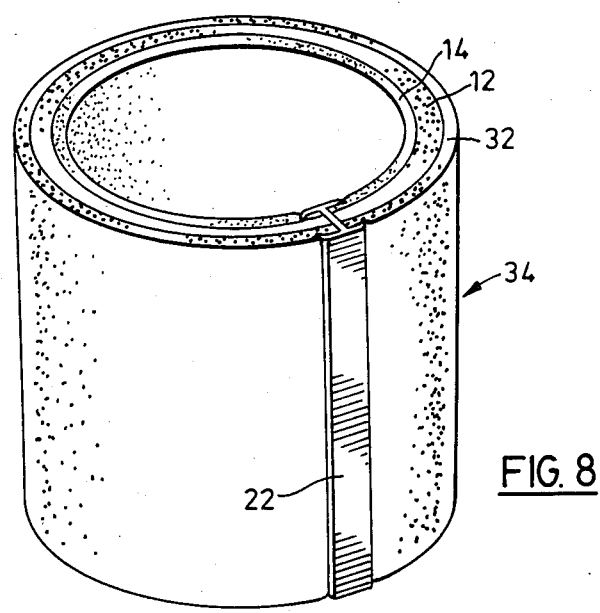
FIG. 8 is a perspective view of a hollow cylindrical configuration of the filter of FIG. 7.

In another preferred embodiment the opposing edges of hollow cylinder 19 may be held together by stitching 40 as seen in FIG. 8.

In the alternate embodiment shown in FIGS. 6 and 7 an air filter 30 has a third, outer layer 32 made of stiff reticulated foam plastic preferably 5 to 10 millimeters thick and not adhering to layer 12 but abutting that layer. This outer layer 32 is useful for heavier duty engines and acts as a purge screen, setting up a cyclonic effect on the incoming air which causes heavier particles in the air to drop off (into the filter casing, not shown) outside the filter. FIG. 7 shows filter 30 formed into a cylinder 34.

The air filter of the present invention provides improved filtration of harmful contaminants such as dust particles related to air flow volume when compared to filters presently in use.

We claim:

1. An air filter comprising a first layer of reticulated foam plastic material having a thickness of between 10 mm and 20 mm and a porosity of 45±4 pores to the linear inch, a second layer of reticulated foam plastic material having a thickness of between 6 mm and 10 mm and a porosity of 65±2 pores to the linear inch, and at the interface between said first and second layers on open mesh substrate approximately one millimeter in thickness constricting a maximum of about ten percent of each of the first and second layers, the filter being impregnated with a flame proof retention and plasticiser additive, the first and second layers being bonded together at the interface.

* * * * *

UNITED STATES PATENT AND TRADEMARK OFFICE
CERTIFICATE OF CORRECTION

PATENT NO. : 4,631,077

DATED : December 23, 1986

INVENTOR(S) : Spicer, Barry ; Willis, Joseph T.

It is certified that error appears in the above-identified patent and that said Letters Patent is hereby corrected as shown below:

In claim 1, column 4, line 12, change "on" to -- an --.

Signed and Sealed this

Seventeenth Day of March, 1987

*Attest:*

DONALD J. QUIGG

*Attesting Officer*  *Commissioner of Patents and Trademarks*